United States Patent
Pogue et al.

(10) Patent No.: US 10,643,609 B1
(45) Date of Patent: May 5, 2020

(54) SELECTING SPEECH INPUTS

(71) Applicant: Amazon Technologies, Inc., Seattle, WA (US)

(72) Inventors: Michael Alan Pogue, Sunnyvale, CA (US); Prachi Choudhary, Burlingame, CA (US); Samuel Keith McDowell, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 15/472,843

(22) Filed: Mar. 29, 2017

(51) Int. Cl.
| | |
|---|---|
| *G10L 15/22* | (2006.01) |
| *G10L 15/18* | (2013.01) |
| *G10L 25/51* | (2013.01) |
| *G10L 15/30* | (2013.01) |
| *G10L 15/16* | (2006.01) |
| *G10L 15/14* | (2006.01) |

(52) U.S. Cl.
CPC ............. *G10L 15/22* (2013.01); *G10L 15/18* (2013.01); *G10L 15/30* (2013.01); *G10L 25/51* (2013.01); *G10L 15/142* (2013.01); *G10L 15/16* (2013.01); *G10L 2015/223* (2013.01)

(58) Field of Classification Search
CPC ... G10L 15/22; G10L 15/26; G06F 17/30702; G06F 17/30976
USPC ........................................................ 704/275
See application file for complete search history.

(56) References Cited

U.S. PATENT DOCUMENTS

| | | | | |
|---|---|---|---|---|
| 6,219,645 | B1* | 4/2001 | Byers ...................... | G10L 15/02 381/91 |
| 6,795,808 | B1* | 9/2004 | Strubbe ............. | G06F 17/30702 704/270 |
| 8,340,975 | B1* | 12/2012 | Rosenberger .......... | G10L 15/22 704/270 |
| 9,064,495 | B1* | 6/2015 | Torok .................. | H04L 43/0852 |
| 9,721,572 | B2* | 8/2017 | Yokoya ................ | H04N 21/233 |
| 2005/0259834 | A1* | 11/2005 | Ariav ..................... | G10L 15/02 381/110 |
| 2011/0125701 | A1* | 5/2011 | Nair ..................... | G06K 9/6293 706/52 |
| 2012/0035935 | A1* | 2/2012 | Park ....................... | G10L 15/22 704/275 |

(Continued)

*Primary Examiner* — Jakieda R Jackson
(74) *Attorney, Agent, or Firm* — Pierce Atwood LLP

(57) ABSTRACT

A speech-processing system can engage in time synchronization between audio capture devices so that if multiple devices detect and process a same utterance, the system may determine which device is closer to a speaker of the utterance by comparing time stamp data from the multiple devices. The devices may synchronize their individual clocks to some time standard that may be disseminated among the devices and/or to a server. When an utterance is captured, the capturing devices may create a time stamp corresponding to when the respective devices detected the utterance. The time stamps may be linked to the synchronized time standard or may be converted to the time standard by another device. The system may then compare the audio data for incoming utterances, and if the same utterance comes from multiple devices, may use the time stamp data to determine which device first detected the utterance. That device may be selected as the device most likely to be closest to the user for various purposes, including sending output data.

16 Claims, 12 Drawing Sheets

(56) References Cited

U.S. PATENT DOCUMENTS

| | | | | |
|---|---|---|---|---|
| 2013/0183944 A1* | 7/2013 | Mozer | ............... | H04L 12/282 |
| | | | | 455/414.1 |
| 2014/0097758 A1* | 4/2014 | Recker | ............... | H05B 37/0272 |
| | | | | 315/152 |
| 2014/0244712 A1* | 8/2014 | Walters | ............... | H04L 67/10 |
| | | | | 709/202 |
| 2014/0310002 A1* | 10/2014 | Nitz | ............... | G06Q 30/06 |
| | | | | 704/270.1 |
| 2015/0006176 A1* | 1/2015 | Pogue | ............... | G10L 15/22 |
| | | | | 704/249 |
| 2015/0006184 A1* | 1/2015 | Marti | ............... | G10L 15/22 |
| | | | | 704/275 |
| 2015/0230075 A1* | 8/2015 | Reunamaki | ............... | H04W 8/005 |
| | | | | 455/41.2 |
| 2016/0098992 A1* | 4/2016 | Renard | ............... | G10L 15/18 |
| | | | | 704/275 |
| 2016/0155443 A1* | 6/2016 | Khan | ............... | G06F 1/3203 |
| | | | | 704/275 |
| 2017/0133011 A1* | 5/2017 | Chen | ............... | H04L 12/4625 |
| 2017/0154629 A1* | 6/2017 | Lu | ............... | G10L 15/22 |
| 2017/0257935 A1* | 9/2017 | Hopperton | ............... | F21S 9/02 |
| 2018/0047394 A1* | 2/2018 | Tian | ............... | G10L 15/24 |
| 2018/0108351 A1* | 4/2018 | Beckhardt | ............... | G10L 15/32 |

* cited by examiner

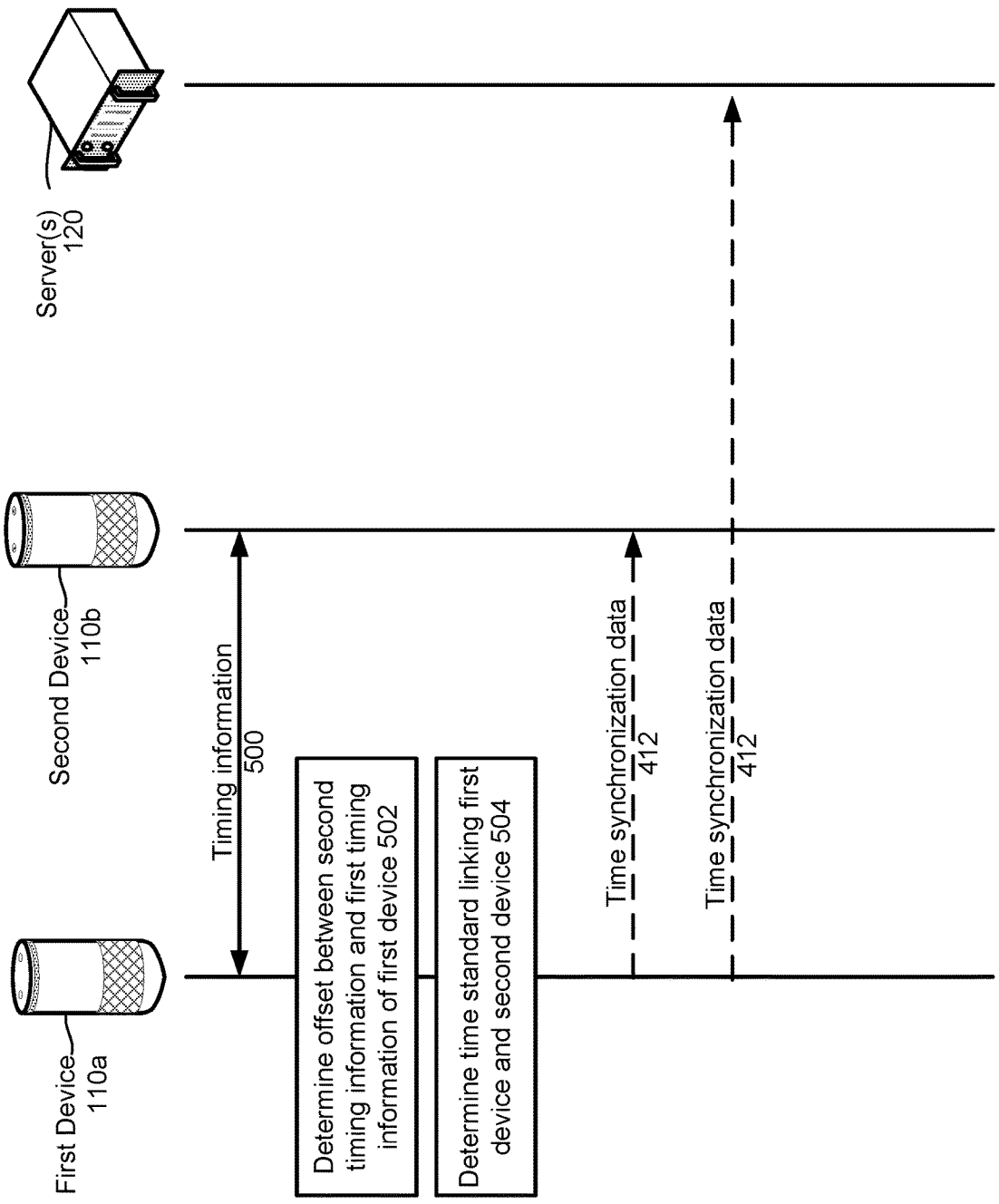

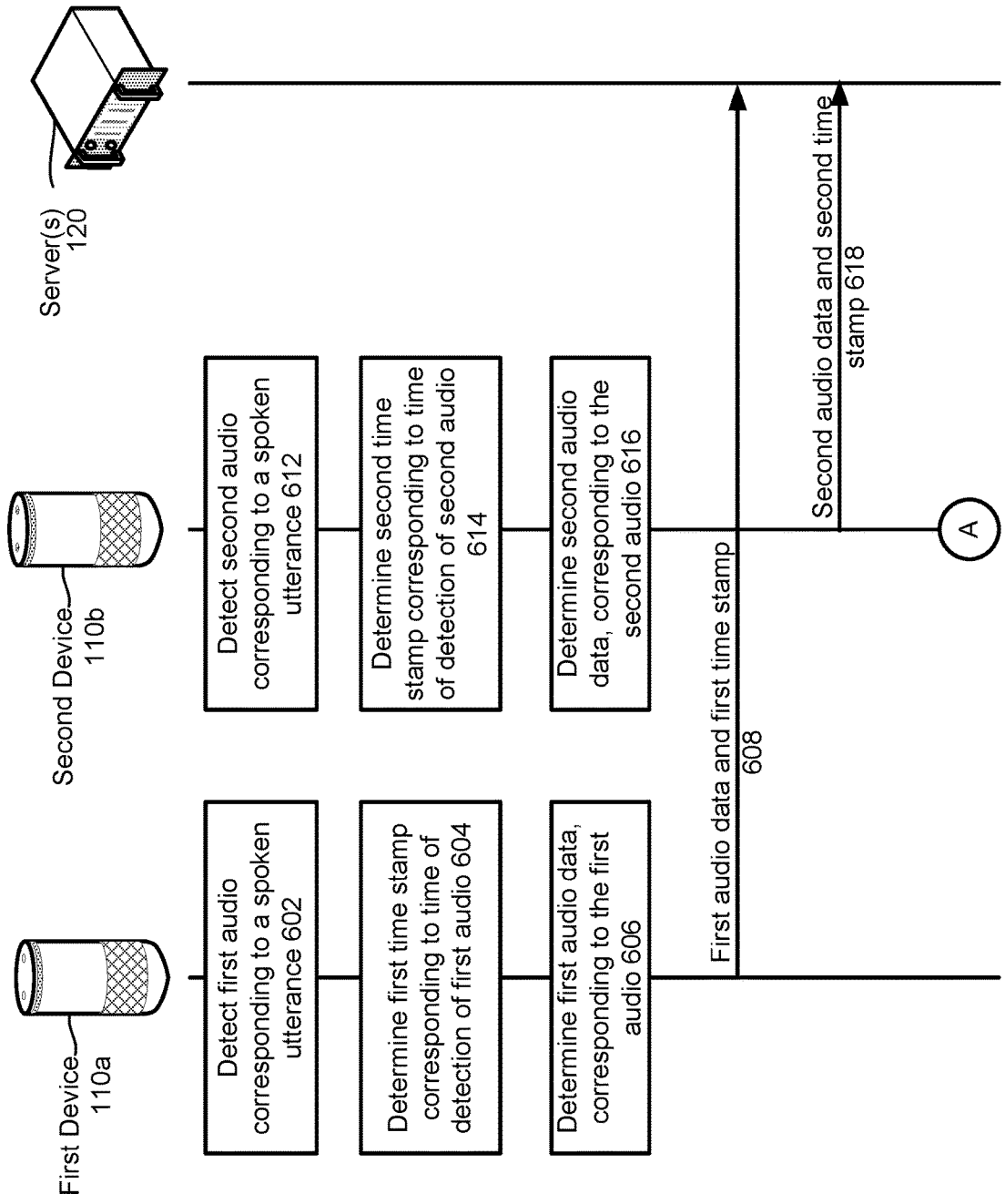

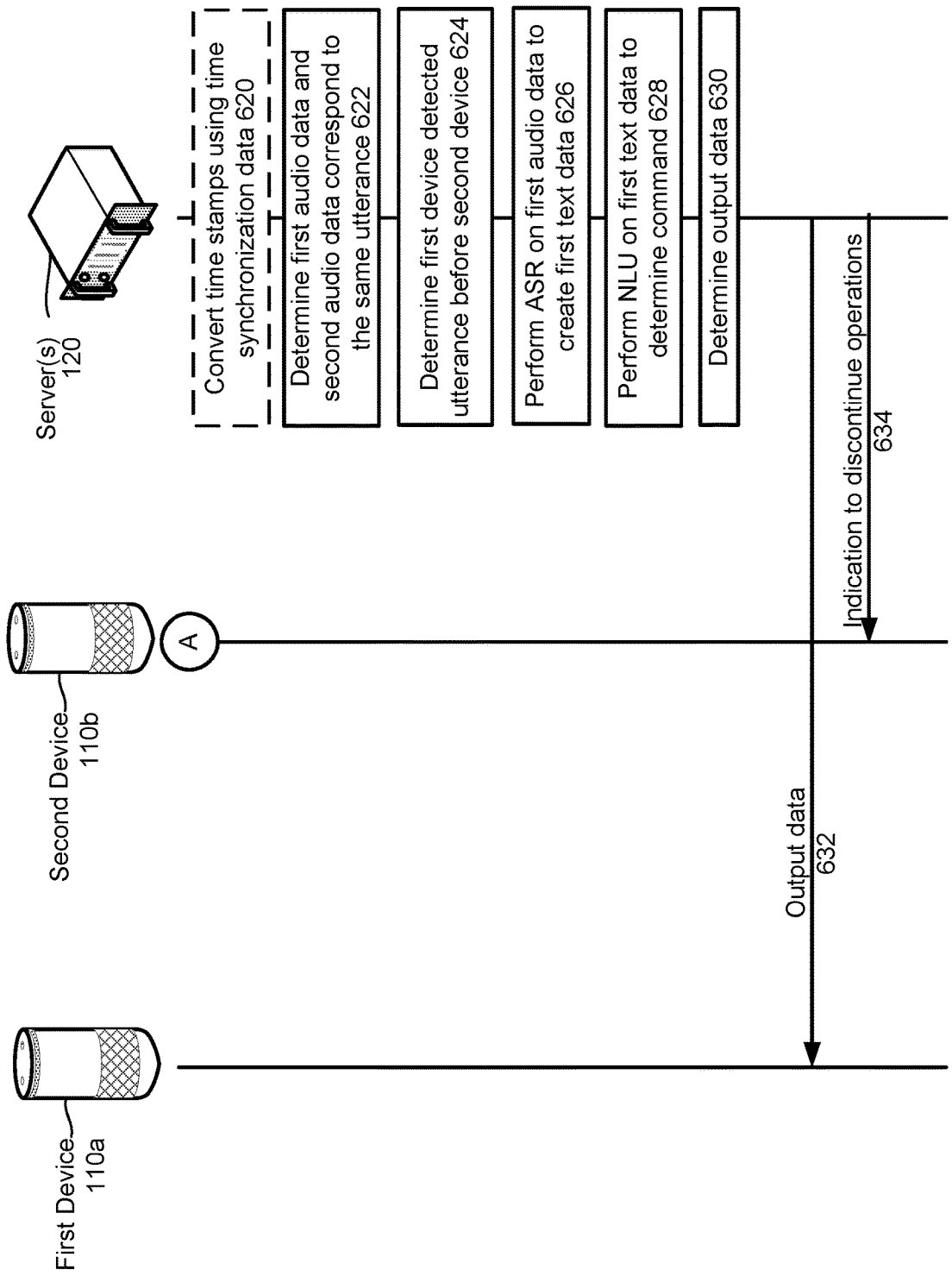

FIG. 7
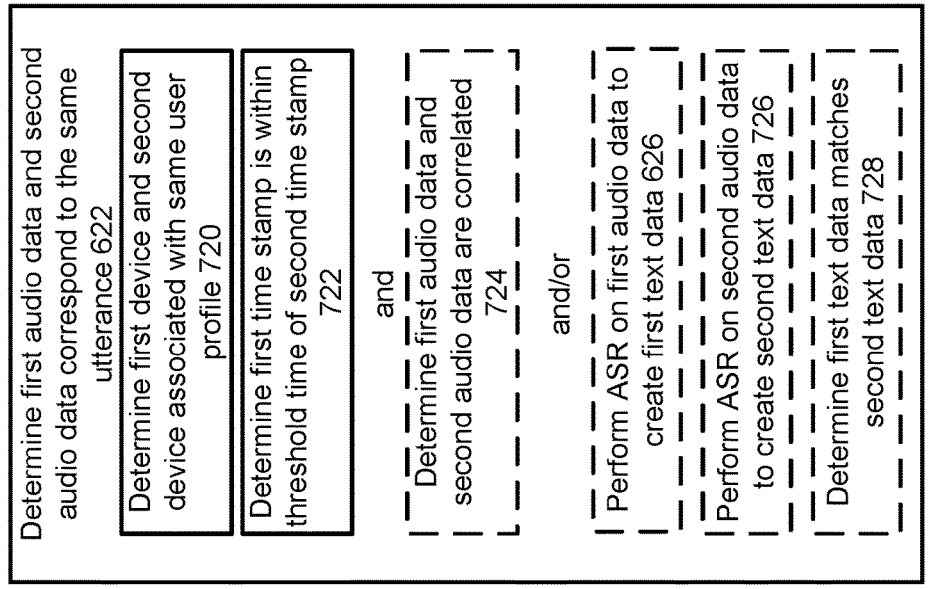

SELECTING SPEECH INPUTS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 illustrates synchronizing timing information between devices according to embodiments of the present disclosure.

FIGS. 6A-6B illustrate determining a device closest to a speaker using audio data received from multiple devices according to embodiments of the present disclosure.

FIG. 7 illustrate techniques for determining audio data from different devices correspond to the same utterance according to embodiments of the present disclosure.

DETAILED DESCRIPTION

Figure 1:
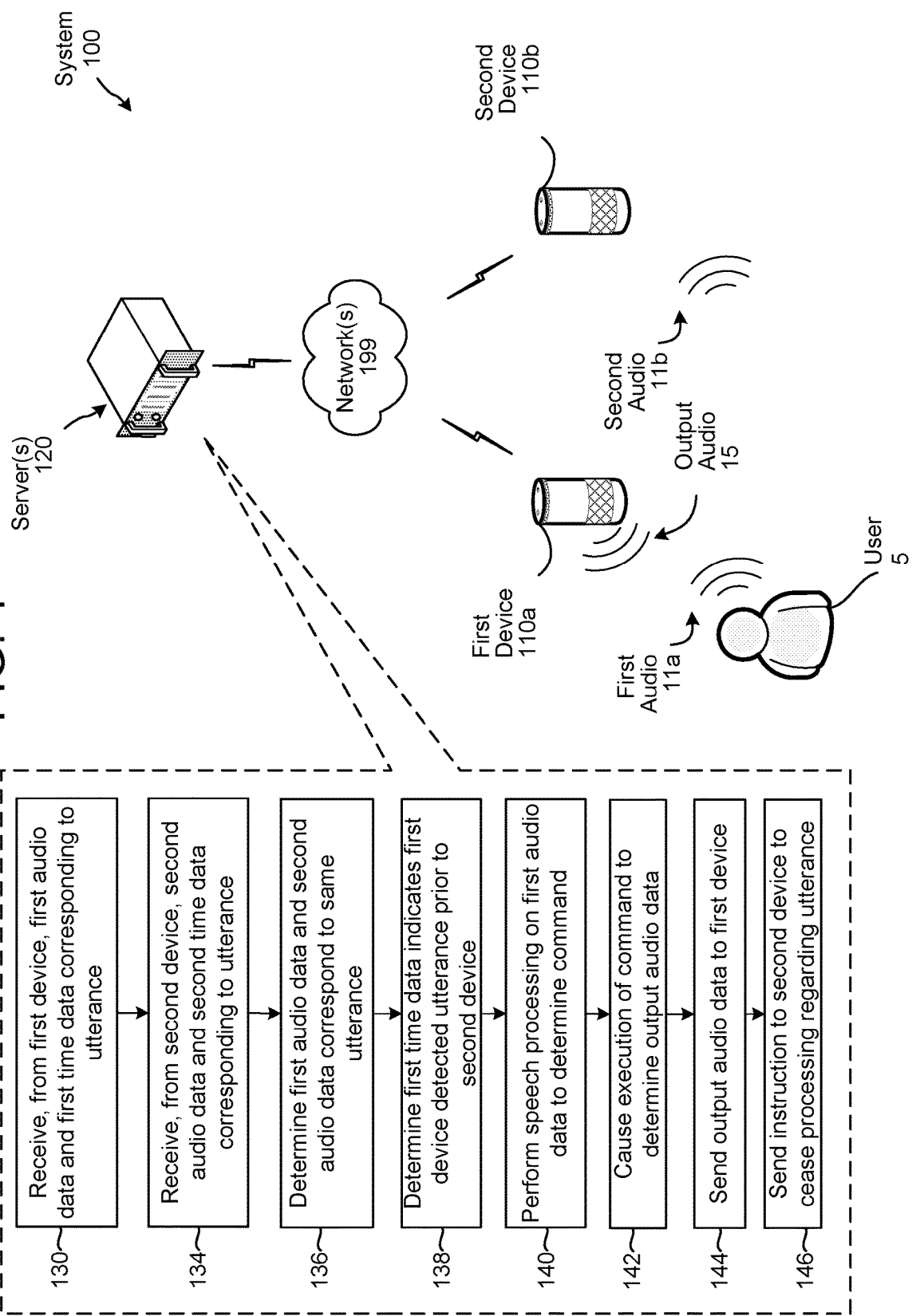
FIG. 1 illustrates a speech processing system configured to determine a user location using time data from synchronized local devices according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

A speech processing system may be configured as a relatively self-contained system where one device captures audio, performs speech processing, and executes a command corresponding to the input speech. Alternatively, a speech processing system may be configured as a distributed system where a number of different devices combine to capture audio of a spoken utterance, perform speech processing, and execute a command corresponding to the utterance.

Depending on system configuration, a speech processing system may be capable of executing a number of different commands such as playing music, answering queries using an information source, opening communication connections, sending messages, shopping, etc. As part of an exchange between a user and the system, the user may assume that the system knows the user's location for purposes of executing the command. For example, a user may speak an utterance such as "turn on the lights," or "play some music" with the intention that the results of the command be executed with regard to the location of the user (such as turning the lights on in the room where the user is or playing music where the user is) even if the user doesn't necessarily specify the location for execution of the command in the utterance (e.g., "play music in the living room"). Further, other operations or components may depend upon a user's location, which may be difficult to determine.

In certain situations, determining the user's location (e.g., which device the user is closest to) may be a relatively straightforward task. For example, if the user has only one speech capture device in her home and speaks a command to that device, the system may relatively easily determine the user's location as the incoming audio data may be associated with that one device. Thus, when incoming audio data originates at the only speech capture device associated with a user, determining the user's location is not difficult.

In multi-device arrangements, for example in a home with multiple devices capable of capturing speech, it may not be so simple to determine which device the user is closest to, particularly where multiple devices may capture the user's speech. Offered is a system configured to determine a closest device to a speaker using synchronized time information. In particular, the system may allow local devices to perform time synchronization to determine how the timing information (e.g., device clock) of one device compares to the timing information of another device. The system (as operated by one of the devices, by another device local to the devices, by a remote server, etc.) may determine an offset between the timing information of different devices. The system may also determine some time standard that can be used by the speech capture devices. The offset, time standard, or other synchronized timing information may be used by the system to determine the relative time of capture of audio by particular devices. For example, a speech capture device may use synchronized timing information to create a time stamp indicating a time of capture of the utterance by the speech capture device. Alternatively, the device may create a time stamp corresponding to the time of capture and send that time stamp to a remote device, such as a server, which has time synchronization information available to it so the server may be equipped to compare non-standardized time stamps from different devices. A server may compare received utterance data from different devices, and if the system determines that two devices captured the same utterance, the system may determine that the device which first detected the utterance is the device closest to the user.

Although the processes illustrated are with respect to two different speech capturing devices, the teachings below hold for more than two devices as well and the disclosure herein is intended to include systems with many such devices.

FIG. 1 shows a speech processing system 100 capable of identifying a device closest to a user. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 local to user 5, as well as one or more networks 199 and one or more servers 120 connected to speech-controlled device(s) 110 across network(s) 199. The server(s) 120 (which may be one or more different physical devices) may be capable of performing traditional speech processing (e.g., ASR, NLU, command processing, etc.) or other operations as described herein. A single server 120 may perform all speech processing or multiple servers 120 may combine to perform all speech processing. Further, the server(s) 120 may execute certain commands, such as answering spoken utterances of the users 5, operating other devices (light switches, appliances, etc.). In addition, certain speech detection or command execution functions may be performed by the speech-controlled device 110. Further, the system may be in communication with external data sources, such as a knowledge base, external service provider devices, or the like.

In one example, as shown in FIG. 1, a first speech-capture device 110a may capture audio of a spoken utterance (i.e., first audio 11a) from user 5 via one or more microphones of the first speech-capture device 110b. The first speech-capture device 110a may send first audio data 111a corresponding to the input audio 11 (as detected by the first device) to the server 120 for processing. The first device 110a may also record the time of detection of the first audio 11a and may determine first time data (such as a time stamp) corresponding to the time of detection of the first audio 11a by the first device 110a. The first device 110a may send the first time data to the server 120. The time stamp may correspond to the beginning of a wakeword at the time it was detected by the first device, the beginning of speech during a session of the utterance. The time stamp may correspond to the device's clock time, to some standardized or synchronized time as described below, or the like.

A second speech-capture device 110b may also be close enough to the user 5 to detect the input audio 11. For purposes of distinguishing between the audio detected by the devices, the audio detected by the first device 110a may be referred to as first audio 11a and the audio detected by the second device may be referred to as second audio 11b. Even though the same utterance may be captured by both devices as part of the first/second audio, the first audio 11a may be different from the second audio 11b due to different acoustic conditions experienced by the first device 110a than experienced by the second device 110b. Thus, the second device 110b may capture second audio 11b of the spoken utterance from user 5 via one or more microphones of the second speech-capture device 110b. The second speech-capture device 110b may send second audio data 111b corresponding to the second audio 11b (as detected by the second device) to the server 120 for processing. The second device 110b may also record the time of detection of the second audio 11b and may determine second time data (such as a time stamp) corresponding to the time of detection of the second audio 11b by the second device 110b. The second device 110b may send the first time data to the server 120.

The server 120 may receive (130), from the first device, the first audio data and the first time data corresponding to the utterance. The server 120 may also receive (132), from the second device, the second audio data and the second time data corresponding to the utterance. The server 120 may determine (136) that the first audio data and second audio data correspond to the same utterance. The server 120 may do so by comparing the first and second audio data, by comparing ASR results of the first and second audio data, or through different techniques. This comparison is done so that the system ensures that the first audio data and second audio data do not correspond to different utterances/commands that should be processed separately. The server 120 may then use the first time data and second time data to determine (138) that the first time data indicates that the first device detected the utterance prior to the second device.

This determination may be made using time data from the devices that is synchronized (e.g., aligned so that the first time data and second time data may be compared against each other). This may also be done if the server 120 has time synchronization information (such as offset data) it can use to align the first time data relative to the second time data. For example, if the time data comprises synchronized time stamps from the individual devices, where the synchronized time stamps are aligned with each other (meaning a time stamp of a particular time on the first device corresponds to the same time on the second device) the server 120 may simply compare the first time data to the second time data to see which device detected the utterance first. If the time data is not synchronized the server 120 may access time synchronization data, which may have been sent to or created by the server ahead of time to allow the time data from the respective devices to be adjusted (such as by an offset between different device clocks) and compared.

The server 120 may perform (140) speech processing (e.g., ASR, NLU, or the like) on the first audio data to determine a command and may cause (142) execution of the command to determine output audio data. The causing of execution may involve actually executing the command (for example by server 120 or some other device of the system) or by sending an instruction to a different device or component to execute the command (such as a third-party application or service). In determining (138) that the first device detected the utterance first, the server 120 may determine that the first device is the device closest to the user 5. The server 120 may then store an indication that the first device is closest to the user and/or may inform some other component or service (such as a downstream application) that the first device is closest to the user 5 so that results of a command or other operations may be performed knowing the location of the user. The server 120 may then send (144) the output audio data of the command to the first device and may also send (146) an instruction or command to the second device to cease processing regarding the utterance (e.g., to close a process associated with the second audio data). This instruction may be sent to advise the second device that the second audio data has been received, but that further operations relative to the second audio data may not be needed by the second device since the first device is the device closest to the user, and thus the device to which the results of the command will be sent.

Figure 2:
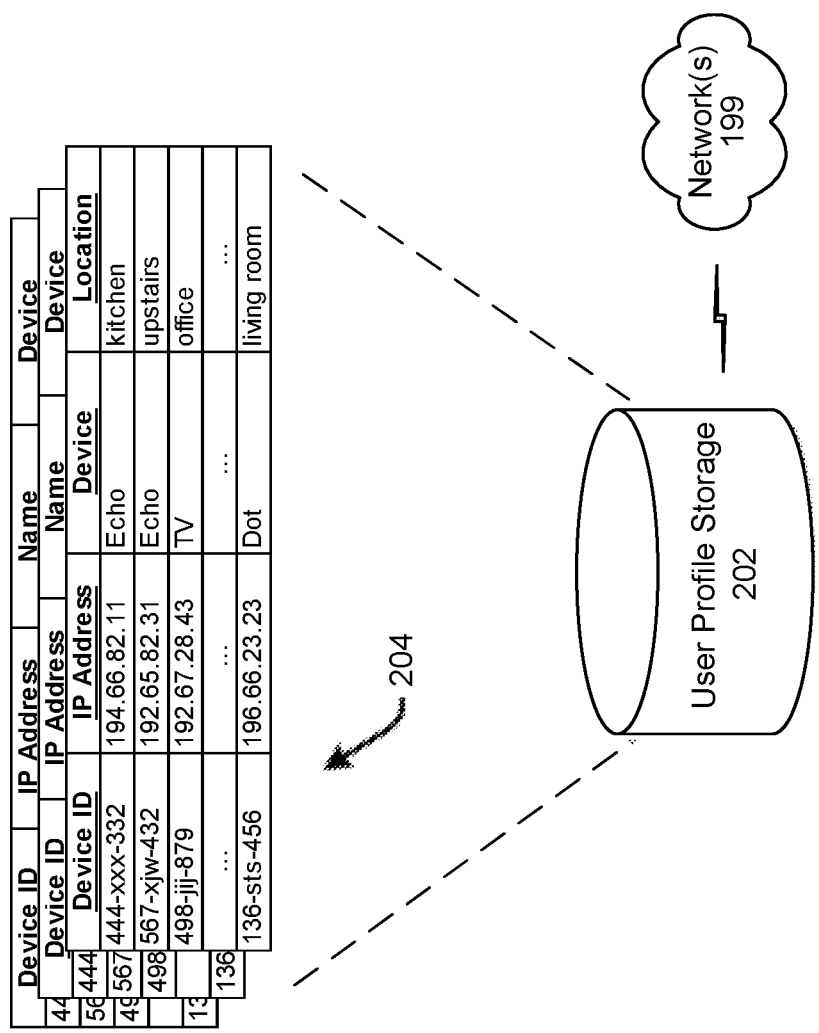
FIG. 2 illustrates data stored and associated with user profiles according to embodiments of the present disclosure.

FIG. 2 illustrates a user profile storage 202 that includes data regarding user accounts 204 as described herein. The user profile storage 202 may be located proximate to the server 120, or may otherwise be in communication with various components, for example over the network 199. The user profile storage 202 may include a variety of information related to individual users, accounts, etc. that interact with the system 100. For illustration, as shown in FIG. 2, the user profile storage 202 may include data regarding the devices associated with particular individual user accounts 204. In an example, the user profile storage 202 is a cloud-based storage. Each user profile 204 may include data such as device identifier (ID) data, speaker identifier (ID) data, voice profiles for users, internet protocol (IP) address data, name of device data, and location of device data for different devices. In addition each user profile 204 may include data regarding the locations of individual devices (including how close devices may be to each other in a home, if the device location is associated with a user bedroom, etc.), address data, or other such information.

As shown in FIG. 1, multiple devices (that may be linked to a same user profile) may be distributed throughout a home, or other environment. Multiple devices in a home may allow users to speak commands to the system when in different rooms, thus expanding the system capabilities and increasing convenience for users. Further, multiple such devices may allow different users in different locations to simultaneously speak different commands to the system. In such an environment, however, multiple devices may detect a same utterances spoken by a user. The circumstances surrounding when multiple devices can detect the same utterance depends on how the speech capture devices are arranged in the home, the acoustic characteristics of the home, the noise level of the acoustic environment, the volume of the speaking user, and other factors.

Figure 3:
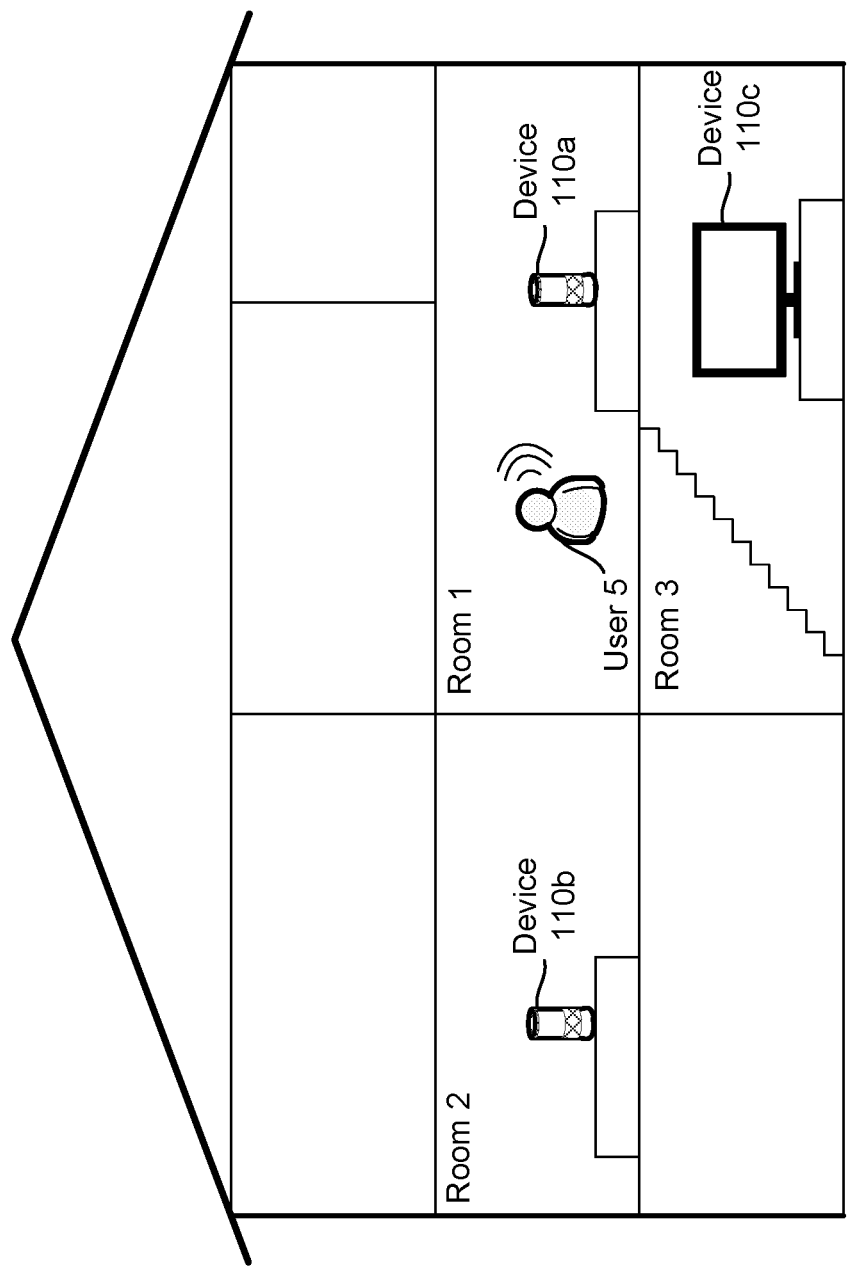
FIG. 3 illustrates capture of an utterance by multiple devices in an environment according to embodiments of the present disclosure.

For example, as shown in FIG. 3, if a user is standing in room 1 and speaking to a first device 110a, the audio from the user's utterance may also be detected by a second device 110b in room 2, and potentially by a third device 110c in room 3. If more than one device detects the wakeword and utterance, more than one device will send audio data to the remote server 120 for processing without any indication as to which "version" of the utterance should be processed. This may be undesirable for several reasons. First, it may result in the system executing multiple commands for the same utterance. Second, it may result in the wrong device being sent the output data for the utterance (for example, if the user asked the first device 110a to play music the music may be sent to and output from the second device 110b).

Certain measures may be taken to determine the device closest to the speaking user. In one example a signal-to-noise ratio (SNR) or other signal quality metric may be used to determine the device closest to the user. For example, if a first device has a high SNR and a second device has a low SNR the system may assume that the first device with a high SNR is the device closest to the user. Such a technique may involve measuring an ambient noise level for purposes of calculating SNR. This technique may work well if each device experiences an identical noise level, but may not provide the best results in less-than-ideal conditions. Another technique may involve comparing the times at which audio data from different devices are received by a server, but this method is also imperfect as such a technique may not precisely account for the time it takes for audio data to travel from a device to a server.

If, however, local devices can synchronize their timing information such that more than one device can use a time standard that applies across devices (or the timing information of devices can be converted or offset to such a standard), the system can compare time stamps corresponding to the time an utterance is detected by different devices. As sound will likely travel at a similar speed in a single acoustic environment (e.g., a home), the system may ignore time-of-flight concerns (e.g., time for audio to travel from the user to a device) and. assuming precise time synchronization, the system may assume that the device that first detects an utterance is the device that is closest to the speaker.

Timing of devices may be synchronized in a number of different ways. In one example, a separate third device may use a timing standard that can be linked to multiple devices. The devices may then send the separate device their respective device-specific timing information (e.g., timing information related to their individual clocks) and the third device may determine individual device's offsets to that timing standard. The offset value may be positive or negative for a particular device depending on how the offset is determined. Those offsets may then be use to standardize the timing information across devices that are in the same home, associated with the same user profile, or the like.

Figure 4:
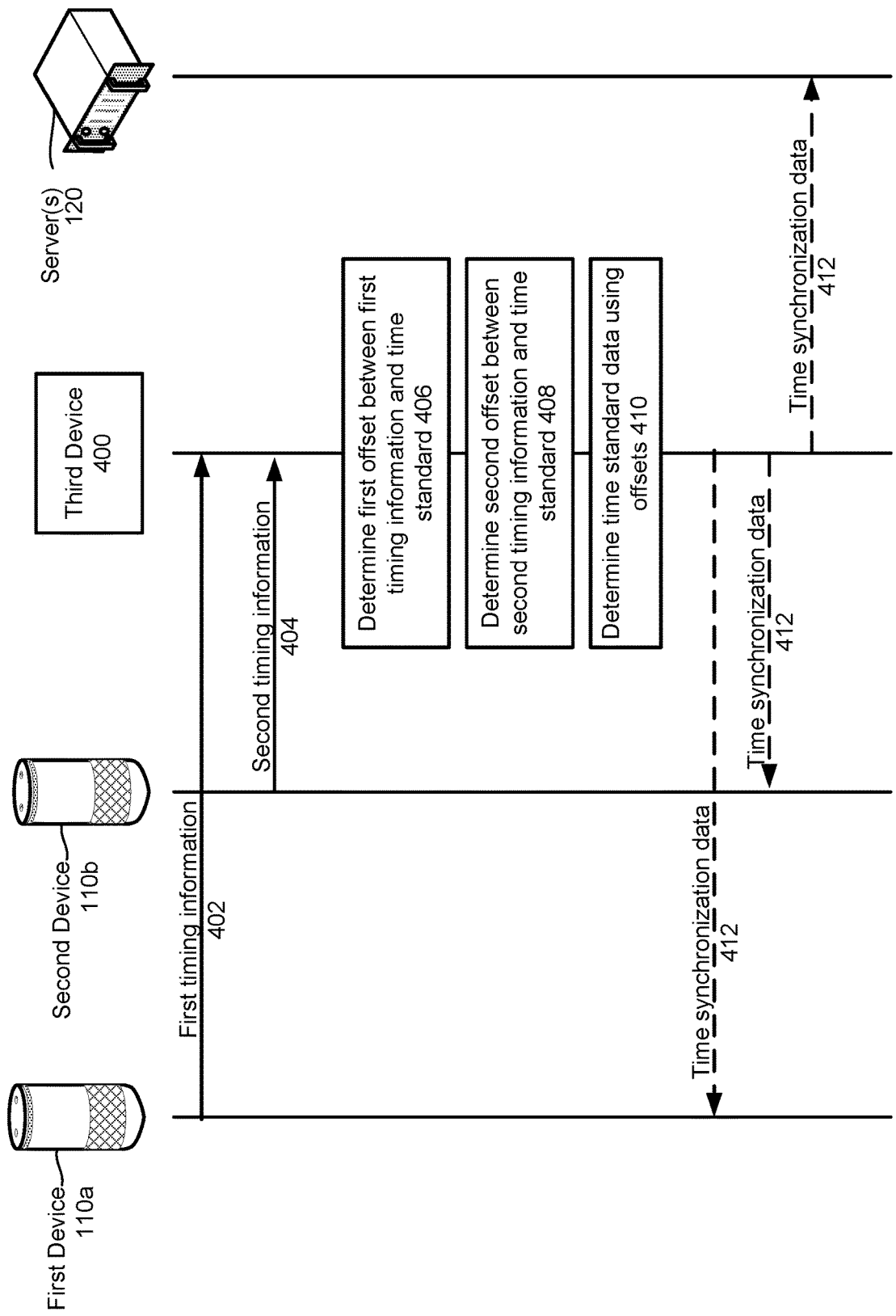
FIG. 4 illustrates synchronizing timing information between devices according to embodiments of the present disclosure.

For example, as shown in FIG. 4, a third device 400 may have access to timing data related to a certain time standard or be configured to determine synchronized timing information based on timing information from individual devices. The third device may be located proximate to the devices 110, for example in the user's home or nearby and communicatively connected (either wirelessly or in a wired fashion) to the devices 110. The third device may also be located remotely (e.g., communicatively connected to the devices 110 over network 199). The third device may actually be server 120, may be another server located with server 120, or another server located elsewhere. In certain circumstances the operations performed by the third device may also be performed by the first device 110a, the second device 110b, or other devices 110 of the system. For illustration purposes, however, the third device 400 is shown a separate device. As shown, the first device 110a sends (402) first timing information to the third device 400. The first timing information may be information related to the first device's processor clock, other component clock, or other time measurement data related to the first device. For example, the timing information may be processor clock data or other timing data. The second device 110b may also send (404) second timing information to the third device 400. The second timing information may be information related to the second device's processor clock, other component clock, or other time measurement data related to the second device. The third device 400 may then determine (406) a first offset between the first timing information and a time standard accessible to/managed by the third device 400. This may involve comparing the first device's clock data to the time standard and determining how far off the first device's clock is from a clock of the time standard. This difference may be the first offset. Other techniques may also be used to compare the first device's timing information to the time standard to determine a relationship between the two. The third device 400 may also determine (408) a second offset between the first timing information and the time standard. The third device 400 may also use various techniques to determine the relationship between the time standard and the second timing information.

Data representing the relationship between the first timing information, the second timing information, and the time standard may be collected/stored as time synchronization data. The time synchronization data may be sent (412) to the first device 110a, second device 110b, and/or server 120. If sent to the individual devices, the time synchronization data may be used to adjust the individual device's clocks so that when an utterance is detected by a device the particular device may use the time synchronization data to create a time stamp or other time indicator that is configured for the time standard, thus allowing time stamps by individual devices to be comparable to each other. The time synchronization data sent to individual devices may differ, in that the third device 400 may only send the first device 110a the time synchronization data needed to synchronize the first device's clock to the standard. Similarly, the third device 400 may only send the second device 110b the time synchronization data needed to synchronize the second device's clock to the standard, and so on. The third device 400 may also send the time synchronization data to the server 120. If the individual devices are not configured to create time stamps according to the time standard/time synchronization data, the server may use the time synchronization data to convert individual device time stamps to some standardized time format so the server may compare standardized time stamps to each other. The devices 110 may include a synchronization component 950, and the server 120 may include a synchronization component 1050, used to exchange timing information and/or perform time synchronizing operations as described herein.

Different time standards may be used. In one example, the third device 400 may use network time protocol (NTP) as a timing standard from which different devices may be offset. An NTP device (such as an NTP server) may be located remotely (e.g., communicatively connected to the devices 110 over network 199). A remote NTP server may be server 120, another server located with server 120, or another server located elsewhere. An NTP server may also be located proximate to the devices 110, for example in the user's home or nearby and communicatively connected to the devices 110. Other time protocols, such as Precision Time Protocol (PTP), IEEE 1588, or other protocols may be used. One drawback to the NTP approach is that using NTP time is not as accurate as may be desired in that NTP accuracy may be on the order of 200 milliseconds, thus resulting in a potential accuracy when comparing time stamps from individual devices on the order of plus or minus 400 milliseconds.

Such a potential time range may not be desirable as sound travels at approximately 1 foot per millisecond. Thus each millisecond of potential accuracy equates to approximately one foot of difference of distance difference. Thus a 400 millisecond range in potential accuracy when comparing device time stamps may not be ideal when determining which device detected an utterance first. It is thus desirable to use a time standard/synchronization technique that is as accurate as possible (though less accurate clocks may also be sufficient for certain uses of the techniques described herein).

To obtain an accurate time standard it may be desirable to have the devices 110 coordinate amongst themselves (or using an accurate third device 400, such as a device 400 that is local to the devices 110) to determine a time standard/time offsets from each other. An example of such coordination between two devices 110 is shown in FIG. 5. Although only two devices 110 are shown, more than two devices may coordinate their timing using similar techniques. As shown, a first device 110a and second device 110b may exchange (500) timing information between each other. The timing information may include the first timing information and/or second timing information discussed above, and/or other data that may be used to determine a time standard or perform other time synchronization operations. The first device 110a may determine (502) an offset between the second timing information of the second device 110b and the first timing information of the first device 110a. The first device 110a may then use the offset information or other information to determine (504) a time standard linking the first device timing and second device timing. The first device 110a may then send (412) time synchronization data to the second device 110b and/or server 120. The time synchronization data, which may include the offset data or other data that can be used to link the first device and second device's timing, may be used by the first and/or second devices to create time stamps in a standardized form that can be compared against each other. The time synchronization data may also be used by the server 120 to resolve individual time data/time stamps received from particular devices 110 into a standard form that can be compared against each other. The devices 110 may include a synchronization component 950 used to exchange timing information and/or perform time synchronizing operations as described herein.

To improve synchronization of timing information among devices 110, the system may use techniques such as those described in U.S. patent application Ser. No. 15/388,258 entitled "Time Synchronization Using Timestamp Exchanges," filed Dec. 22, 2016 in the name of Michael Alan Pogue, U.S. patent application Ser. No. 15/388,346 entitled "Time Synchronization Using Timestamp Exchanges," filed Dec. 22, 2016 in the names of Michael Alan Pogue, et al., and/or U.S. patent application Ser. No. 15/363,812 entitled "Audio Placement Algorithm," filed Nov. 29, 2016 in the names of Michael Alan Pogue, et al. These patent applications are hereby incorporated by reference in their entireties. Using synchronization techniques such as those described in the above patent application may result in more accurate time synchronization between devices, which in turn may result in time accuracy being within, for example, 50-100 microseconds, which in turn may result in more precise differences being calculable in terms of which device is closer to a speaking user. Thus the time synchronization data available to the devices 110 and/or server 120 may have a high accuracy.

The time synchronization operations may occur during a configuration phase, for example when a new device 110 is brought online or linked to a particular user account 204 or during some other setup phase. As synchronization operations may take some time, an indicator may be generated by or sent to the server 120 and/or user account 204 when a device 110 is time synchronized to other devices in a home, environment, or associated with a particular user account 204. The system 100 may wait until it detects an indication that a device is time synchronized prior to attempting to determine a closest device using a time stamp technique as described herein. If a device is not yet time synchronized with other devices, the system 100 may use another method to detect a closest device, for example a signal quality method as described above.

During runtime operations, e.g., when the system detects and processes utterances, the operations may proceed as described in FIGS. 6A-6B. As shown in FIG. 6A, a first device 110a may detect (602) first audio corresponding to a spoken utterance. The first device 110a may determine (604) a first time stamp or other time data corresponding to a time the first device detected the first audio. The first time stamp may be based on standardized time data as determined above (e.g., in a format that can be compared to time stamps from other devices), or may be based solely on a clock/timing information of the first device (which may be reconciled to a synchronized/standard time later by the server 120 or other component). The first device 110a may also determine (606) first audio data corresponding to the first audio, for example using microphone(s) 907 of the first device 110a. The first device 110a may then send (608) the first audio data and the first time stamp/time data to the server 120.

As also shown in FIG. 6A, a second device 110b may detect (612) second audio corresponding to the same spoken utterance as detected by the first device 110a. The second device 110b may determine (614) a second time stamp or other time data corresponding to a time the second device detected the second audio. The second time stamp may be based on standardized time data as determined above (e.g., in a format that can be compared to time stamps from other devices), or may be based solely on a clock/timing information of the second device (which may be reconciled to a synchronized/standard time later by the server 120 or other component). The second device 110b may also determine (616) second audio data corresponding to the second audio, for example using microphone(s) 907 of the second device 110b. The second device 110b may then send (618) the second audio data and the second time stamp/time data to the server 120.

As shown in FIG. 6B, the server may convert (620) the incoming time stamps using time synchronization data if the time stamps are not in a synchronized form prior to being sent by the individual devices. The server may then determine (622) that the first audio data and second audio data correspond to the same utterance. To determine (622) the first audio data and second audio data correspond to the same utterance the server 120 may perform several steps as shown in FIG. 7. First, the server 120 may determine (720) that the first device 110a and second device 110b are associated with a same user profile. The server may also determine (722) that the first time stamp (as synchronized) indicates a time within a threshold of the second time stamp (as synchronized). This may be done to prevent the system 100 from canceling processing of what should be considered to separate utterances. For example, if one user speaks a command of "what time is it" to a first device and several seconds later a second user speaks a command of "what time is it" to a second device, the system 100 should likely process those as separate commands rather than determining they are the same command detected by two different devices. The time threshold may be configured by the system but may be a time sufficient to distinguish individual utterances, for example a few seconds.

Returning to FIG. 7, the server 120 may compare the first audio data and second audio data, for example by determining (724) that the first audio data and second audio data are correlated. That is, the server 120 may determine that the first audio data is sufficiently similar to the second audio data with regard to the speech detected, thus indicating that the utterance captured by one device is the same as the utterance captured by the other device. The server may determine a correlation metric between the first audio data and second audio data and may determine that the correlation metric is above a particular threshold. The server 120 may also determine the audio data correspond to the same utterance by comparing the post-ASR results for each audio data. For example, the server 120 may perform (626) ASR on the first audio data to create first text data and may perform (726) ASR on the second audio data to create second text data. The server 120 may then determine (728) that the first text data substantially matches the second text data (within some configurable threshold of similarity) to determine that the same utterance is represented in the first audio data and second audio data. A substantial match may be determined if the text data has a certain number of words that are identical, similar word order, or otherwise similar if not identical words (e.g., homophones) whose differences may be attributed to ASR errors even though the underlying audio may be similar (e.g., their v. they're or the like).

Returning to FIG. 6B, the server may determine (624) that the first device 110a detected the utterance before the second device 110b by comparing their synchronized time stamps and determining that the first time stamp indicates a time before the second time stamp. The server 120 may thus determine that the first device 110a is closer to the user than the second device 110b. The server 120 may store an indication that the first device 110a is closer to the user and may also notify other components, systems, services, etc. of the closest device for various purposes. The server may then (if it has not already) perform (140) speech processing on the first audio data (e.g., perform (626) ASR on the first audio data to create first text data, perform and perform (628) NLU on the first text data to determine a command and then determine (630) output data corresponding to the command. Determining the output data may involve executing the command, sending data to another component or service (such as command processor 890) to execute the command, or the like. The server 120 may then send (632) the output data to the first device (or a destination indicated by the command). The server 120 may also indicate to another component/service where to send the output data associated with the command. The server 120 may also send (634) an indication to the second device to discontinue operations with regard to the second audio data as the second device has been determined to not be the primary device for the particular utterance. The second device may then output some visual indicator that it is no longer involved in processing of the command (such as turning off a light on its device or some other activity) while the first device may output some visual indicator that it continues to be involved in processing of the command (such as continuing display of a light on its device, changing a light color, or some other activity).

Figure 8:
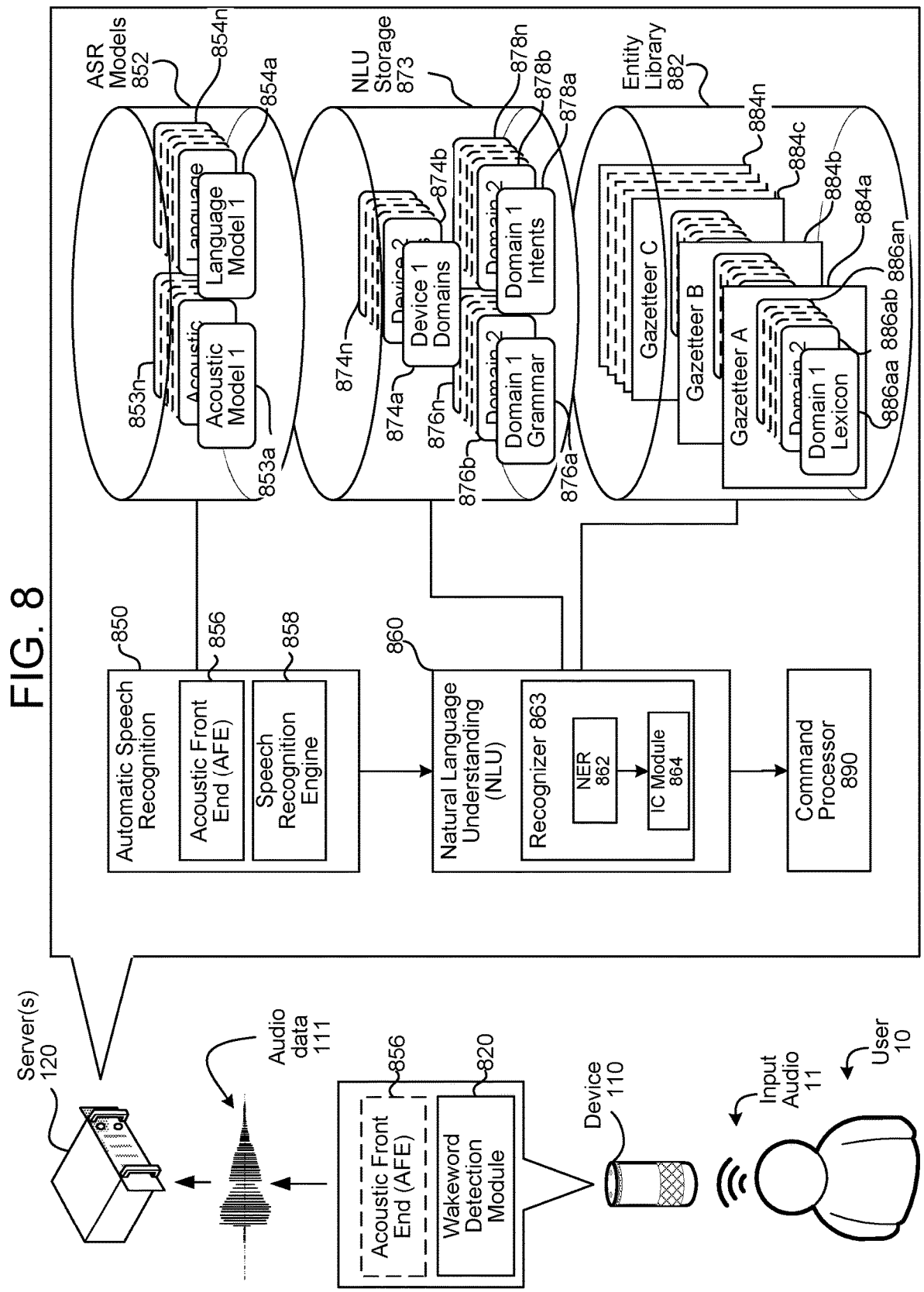
FIG. 8 is a diagram of components of speech processing system according to embodiments of the present disclosure.

Further details of the speech-processing system 100 are explained below. The system 100 of FIG. 1 may operate using various speech processing components as described in FIG. 8. FIG. 8 is a conceptual diagram of how a spoken utterance is processed. The various components illustrated may be located on a same or different physical devices. Communication between various components illustrated in FIG. 8 may occur directly or across a network 199. An audio capture component, such as the microphone of the speech-controlled device 110 (or other device), captures input audio 11 corresponding to a spoken utterance. The device 110, using a wakeword detection module 820, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 850. The audio data 111 may be output from an acoustic front end (AFE) 856 located on the device 110 prior to transmission. Or the audio data 111 may be in a different form for processing by a remote AFE 856, such as the AFE 856 located with the ASR module 850.

The wakeword detection module 820 works in conjunction with other components of the device 110, for example a microphone (not illustrated) to detect keywords in audio 11. For example, the device 110 may convert audio 11 into audio data, and process the audio data with the wakeword detection module 820 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 820 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 820 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending.

Upon receipt by the server(s) 120, an ASR module 850 may convert the audio data 111 into text. The ASR module 850 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 854 stored in an ASR model knowledge base (i.e., ASR model storage 852). For example, the ASR module 850 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 853 stored in the ASR model storage 852), and a likelihood that a particular word that matches the sound would be included in the sentence at the specific location (e.g., using a language model 854 stored in the ASR model storage 852). Thus, each potential textual interpretation of the spoken utterance (i.e., hypothesis) is associated with a confidence score. Based on the considered factors and the assigned confidence score, the ASR module 850 outputs the most likely text recognized in the audio data 111. The ASR module 850 may also output multiple hypotheses in the form of a lattice or an N-best list with each hypothesis corresponding to a confidence score or other score (e.g., such as probability scores, etc.).

The device or devices including the ASR module 850 may include an AFE 856 and a speech recognition engine 858. The AFE 856 transforms the audio data 111, captured by the microphone 907, into data for processing by the speech recognition engine 858. The speech recognition engine 858 compares the speech recognition data with acoustic models 853, language models 854, and other data models and information for recognizing the speech conveyed in the audio data 111. The AFE 856 may reduce noise in the audio data 111 and divide the digitized audio data 111 into frames representing time intervals for which the AFE 856 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 856 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 858 may process data output from the AFE 856 with reference to information stored in the ASR model storage 852. Alternatively, post front-end processed data (e.g., feature vectors) may be received by the device executing ASR processing from another source besides the internal AFE 856. For example, the speech-controlled device 110 may process audio data 111 into feature vectors (e.g., using an on-device AFE 856) and transmit that information to the server 120 across the network 199 for ASR processing. Feature vectors may arrive at the server 120 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 850 will output speech results that make sense grammatically.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.)

The device performing NLU processing 860 (e.g., server 120) may include various components, including potentially dedicated processor(s), memory, storage, etc. As shown in FIG. 8, an NLU component may include a recognizer 863 that includes a named entity recognition (NER) module 862 which is used to identify portions of query text that correspond to a named entity that may be recognizable by the system. A downstream process called named entity resolution actually links a text portion to an actual specific entity known to the system. To perform named entity resolution, the system may utilize gazetteer information (884a-884n) stored in entity library storage 882. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways. The NER module 862 (or other component) may also determine whether a word refers to an entity that is not explicitly mentioned in the utterance text, for example "him," "her," "it" or other anaphora, exophora or the like.

Generally, the NLU process takes textual input (such as processed from ASR 850 based on the utterance input audio 11) and attempts to make a semantic interpretation of the text. That is, the NLU process determines the meaning behind the text based on the individual words and then implements that meaning. NLU processing 860 interprets a text string to derive an intent or a desired action from the user as well as the pertinent pieces of information in the text that allow a device (e.g., device 110) to complete that action. For example, if a spoken utterance is processed using ASR 850 and outputs the text "call mom" the NLU process may determine that the user intended to activate a telephone in his/her device and to initiate a call with a contact matching the entity "mom" (which may involve a downstream command processor 890 linked with a telephone application).

The NLU may process several textual inputs related to the same utterance. For example, if the ASR 850 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 872.

To correctly perform NLU processing of speech input, an NLU process 860 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 862 receives a query in the form of ASR results and attempts to identify relevant grammars and lexical information that may be used to construe meaning. To do so, the NLU module 860 may begin by identifying potential domains that may relate to the received query. The NLU storage 873 includes a databases of devices (874a-874n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Speaker ID, or Household ID, or some other indicator.

In NLU processing, a domain may represent a discrete set of activities having a common theme, such as "shopping", "music", "calendaring", etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result. This is described further in detail below in reference to FIG. 3.

An intent classification (IC) module 864 parses the query to determine an intent or intents for each identified domain, where the intent corresponds to the action to be performed that is responsive to the query. Each domain is associated with a database (878a-878n) of words linked to intents. For example, a music intent database may link words and phrases such as "quiet," "volume off," and "mute" to a "mute" intent. The IC module 864 identifies potential intents for each identified domain by comparing words in the query to the words and phrases in the intents database 878. Traditionally, the determination of an intent by the IC module is performed using a set of rules or templates that are processed against the incoming text to identify a matching intent.

In order to generate a particular interpreted response, the NER 862 applies the grammar models and lexical information associated with the respective domain to actually recognize a mention one or more entities in the text of the query. In this manner the NER 862 identifies "slots" (i.e., particular words in query text) that may be needed for later command processing. Depending on the complexity of the NER 862, it may also label each slot with a type of varying levels of specificity (such as noun, place, city, artist name, song name, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC module 864 are linked to domain-specific grammar frameworks (included in 876) with "slots" or "fields" to be filled. Each slot/field corresponds to a portion of the query text that the system believes corresponds to an entity. For example, if "play music" is an identified intent, a grammar (876) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 862 may parse the query to identify words as subject, object, verb, preposition, etc., based on grammar rules and/or models, prior to recognizing named entities. The identified verb may be used by the IC module 864 to identify intent, which is then used by the NER module 862 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 864 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 862 may search the database of generic words associated with the domain (in the knowledge base 872). So for instance, if the query was "play songs by the rolling stones," after failing to determine an album name or song name called "songs" by "the rolling stones," the NER component 862 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output data from the NLU processing (which may include tagged text, commands, etc.) may then be sent to a command processor 890, which may be located on a same or separate server 120 as part of system 100. The system 100 may include more than one command processor 890, and the destination command processor 890 may be determined based on the NLU output. For example, if the NLU output includes a command to play music, the destination command processor 890 may be a music playing application, such as one located on device 110 or in a music playing appliance, configured to execute a music playing command.

If the NLU output includes a search utterance (e.g., requesting the return of search results), the command processor 890 selected may include a search engine processor, such as one located on a search server, configured to execute a search command and determine search results, which may include output text data to be processed by a text-to-speech engine and output from a device as synthesized speech.

If the NLU output includes a command to obtain content from another source, the command processor 890 or other component, through an application program interface (API), may send a request for such content to an appropriate application server or other device. The application server may send the content, for example audio content, to the command processor 890 or other component. In certain instances, the output content sent from the application server may include a link that may be sent from the server 120 to the local device 110 closest to the user (e.g., first device 110a) so that the first device 110a may use the link to access the output content desired by the user. In this case the output content data may be sent from the application server through the server 120 to the first device 110a or directly from the application server to the first device 110a (or some other destination appropriate to the command). In certain instances the output content data may be audio data (such as music, a prerecorded reading of an audio book, etc.) and thus may be output through a speaker of the local device 110. In other instances the output content data may be text data (either generated by the application server or by a component of the server(s) 120) that needs to be converted into audio data prior to being output to a user using the local device 110.

Figure 9:
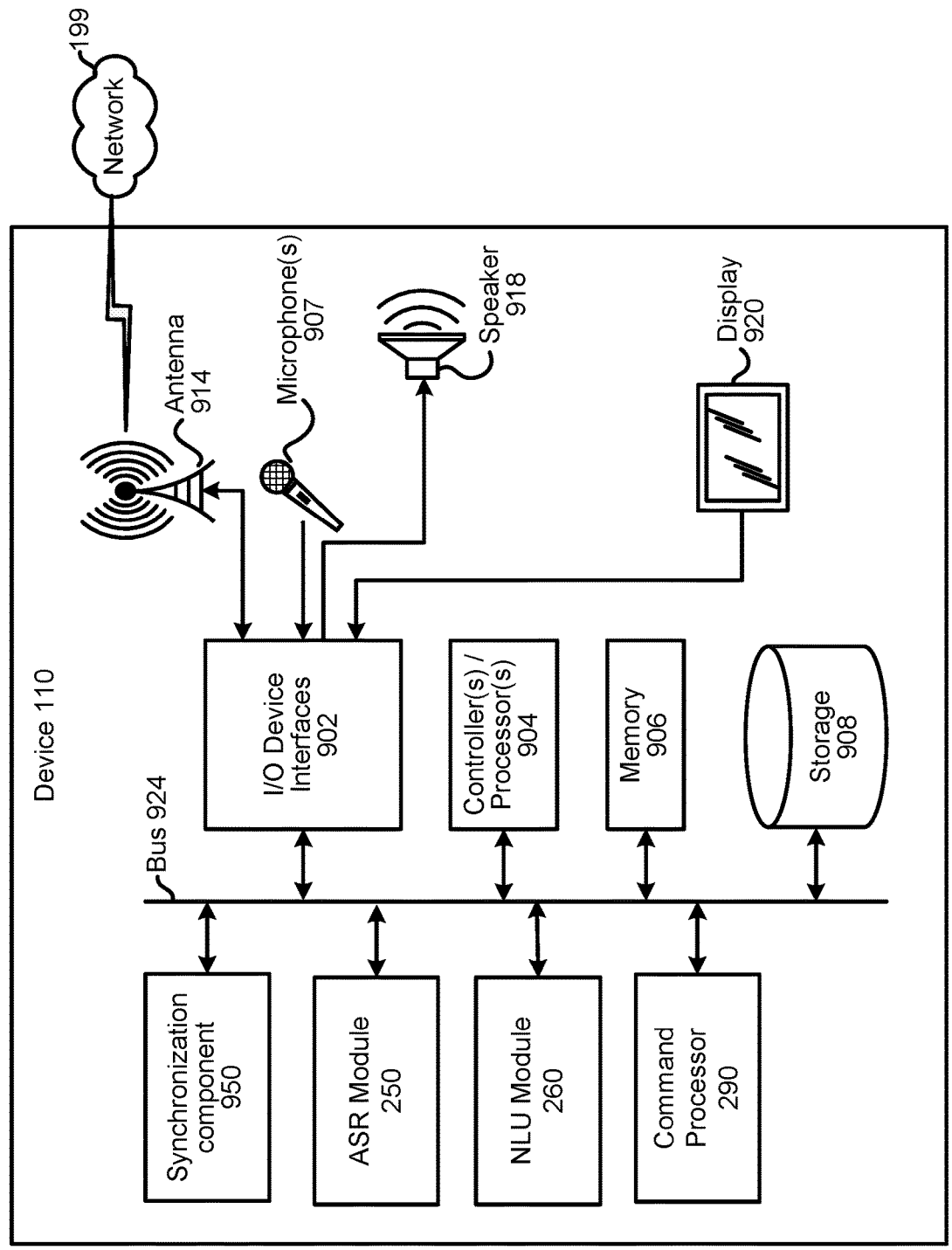
FIG. 9 is a block diagram conceptually illustrating example components of a device according to embodiments of the present disclosure.
Figure 10:
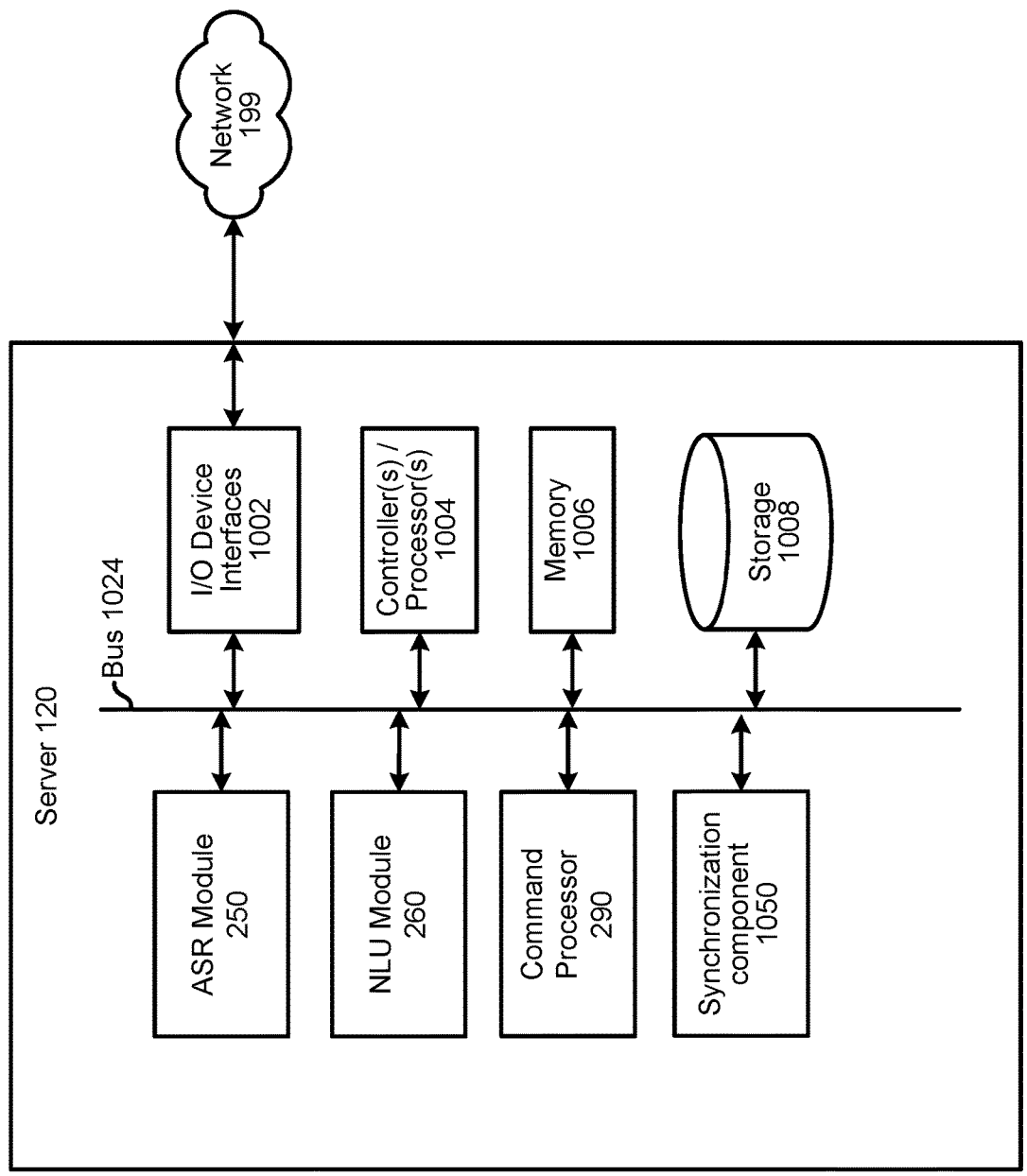
FIG. 10 is a block diagram conceptually illustrating example components of a server according to embodiments of the present disclosure.

FIG. 9 is a block diagram conceptually illustrating a user device 110 (e.g., the speech-capture device 110 described herein) that may be used with the described system. FIG. 10 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (904/1004), that may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM) and/or other types of memory. Each device (110/120) may also include a data storage component (908/1008), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 918, a visual output component such as a display 920, a wired headset or a wireless headset (not illustrated), or other component capable of outputting audio. The display 920 may output image and/or video data as described herein. The device 110 may also include an audio capture component. The audio capture component may be, for example, a microphone 907 or array of microphones, a wired headset or a wireless headset (not illustrated), etc. The microphone 907 may be configured to capture audio. If an array of microphones is included, approximate distance to a sound's point of origin may be determined by acoustic localization based on time and amplitude differences between sounds captured by different microphones of the array.

For example, via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, etc. A wired connection such as Ethernet may also be supported. Through the network(s) 199, the speech processing system may be distributed across a networked environment.

The device 110 and/or the server 120 may include an ASR module 850. The ASR module 850 in the device 110 may be of limited or extended capabilities. The ASR module 850 may include the language models 854 stored in ASR model storage component 852. If limited speech recognition is included, the ASR module 850 may be configured to identify a limited number of words, whereas extended speech recognition may be configured to recognize a much larger range of words.

The device 110 and/or the server 120 may include a limited or extended NLU module 860. The NLU module 860 in the device 110 may be of limited or extended capabilities. The NLU module 860 may comprise the name entity recognition module 862, the intent classification module 864, and/or other components. The NLU module 860 may also include a stored knowledge base and/or entity library, or those storages may be separately located.

The device 110 and/or the server 120 may also include the command processor 890 configured to execute commands/functions associated with a spoken utterance as described herein.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 9 and 10, are exemplary, and may be located as a stand-alone device or may be included, in whole or in part, as a component of a larger device or system.

Figure 11:
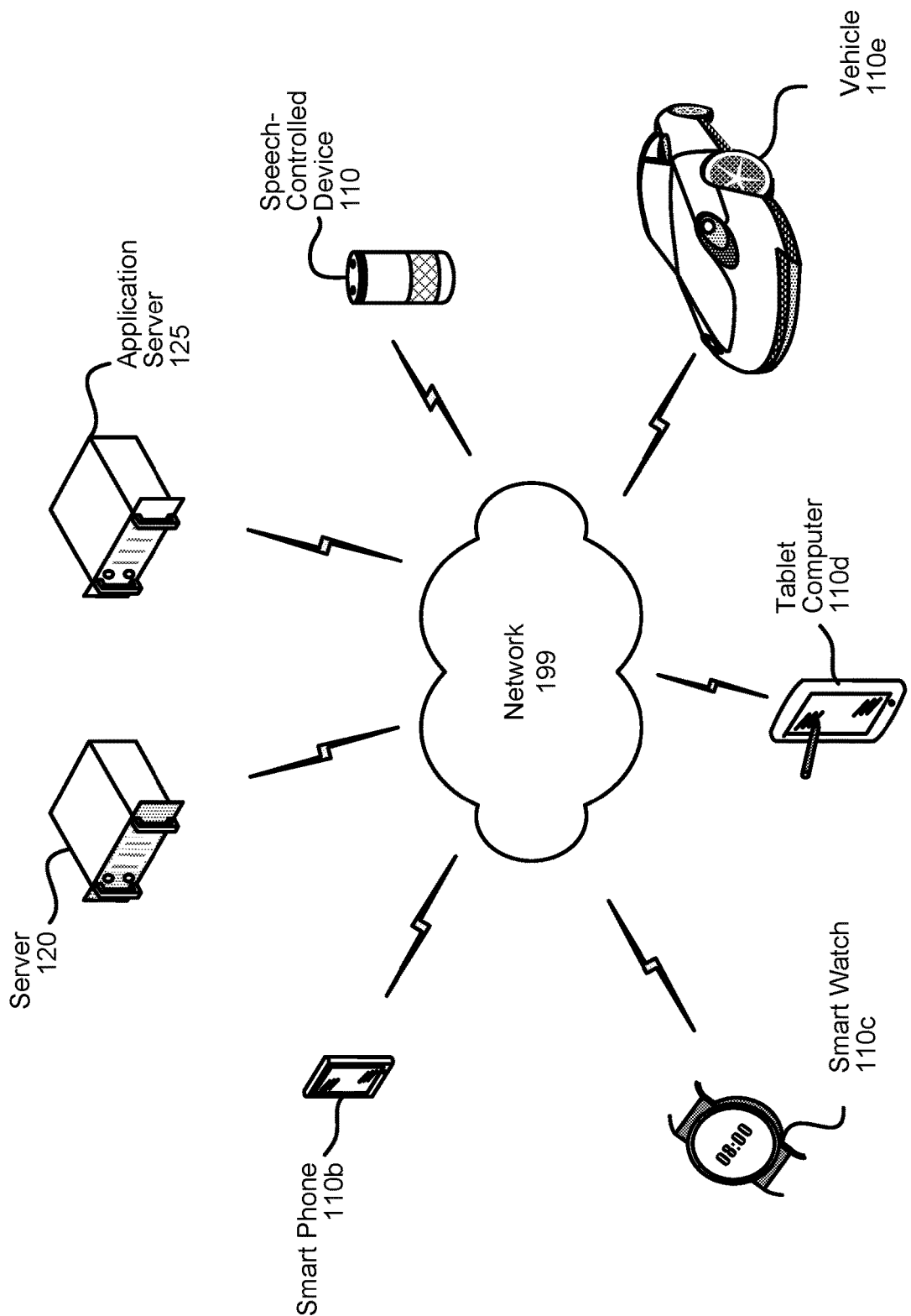
FIG. 11 illustrates an example of a computer network for use with the system.

As illustrated in FIG. 11, multiple devices (120, 110, 110b-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110, a tablet computer 110d, a smart phone 110b, a smart watch 110c, and/or a vehicle 110e may be connected to the network 199 through a wireless service provider, over a WiFi or cellular network connection, or the like. Other devices are included as network-connected support devices, such as the server 120, application developer devices (e.g., the application server 125), or others. The support devices may connect to the network 199 through a wired connection or wireless connection. Networked devices may capture audio using one-or-more built-in or connected microphones 907 or audio capture devices, with processing performed by ASR, NLU, or other components of the same device or another device connected via the network 199, such as the ASR module 850, the NLU module 860, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 856, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   by a first device:
   determining first clock data corresponding to operation of a processor clock of the first device,
   receiving second clock data from a second device, the second clock data corresponding to operation of a processor clock of the second device,
   determining an offset value between the first clock data and the second clock data,
   sending the offset value to the second device,
   detecting, at a first processor clock time, first audio corresponding to an utterance,
   combining the offset value to the first processor clock time to determine a first time stamp,
   determining first audio data corresponding to the first audio, and
   sending the first audio data and the first time stamp to a remote device;
   by the second device:
   receiving the offset value from the first device,
   detecting, at a second processor clock time, second audio corresponding to the utterance,
   combining the offset value to the second processor clock time to determine a second time stamp,
   determining second audio data corresponding to the second audio, and
   sending the second audio data and the second time stamp to the remote device;
   by the remote device:
   receiving the first audio data and the first time stamp from the first device,
   receiving the second audio data and the second time stamp from the second device,
   determining that the first device and the second device are associated with a same user profile;
   determining that the first audio data is correlated to the second audio data,
   determining that the first audio data and the second audio data correspond to a same utterance, determining that the first time stamp indicates an earlier time than the second time stamp, and determining that the first device detected the first audio before the second device detected the second audio.

2. The computer-implemented method of claim 1, further comprising, by the remote device:

sending, to the second device, a command to close a process associated with the second audio data;

performing automatic speech recognition (ASR) on the first audio data to obtain first text data;

performing natural language understanding (NLU) processing on the first text data to determine a command;

determining output data corresponding to the command; and sending the output data to the first device.

3. The computer-implemented method of claim 1, further comprising, by the remote device:

prior to receiving the first time stamp, receiving, from the first device, an indication that the first device has determined the offset value corresponding to the first device and second device.

4. The computer-implemented method of claim 1, further comprising, by the remote device:

receiving, from the first device, the offset value; and storing an association between the offset value and the user profile.

5. A system comprising:

at least one processor; and memory including instructions operable to be executed by the at least one processor to configure the system to:

receive first audio data corresponding to first audio detected by a first device;

receive first time data corresponding to a time of detection of the first audio by the first device;

receive second audio data corresponding to second audio detected by a second device;

receive second time data corresponding to a time of detection of the second audio by the second device;

determine an offset value between the first time data and the second time data;

determine a correlation between the first audio data and the second audio data;

determine that the first device and the second device are associated with a same user profile;

determine, based in part on the offset value and the correlation, that the first audio data and the second audio data correspond to a same utterance; and use the first time data and the second time data to determine that the first device detected the utterance prior to the second device detecting the utterance.

6. The system of claim 5, wherein the memory further comprises instructions that further configure the system to:

perform speech processing on the first audio data to determine a command;

determine output data corresponding to the command; and in response to determining that the first device detected the utterance prior to the second device detecting the utterance, send the output data to the first device.

7. The system of claim 5, wherein the memory further comprises instructions that further configure the system to:

send, to the second device, a command to close a process associated with the second audio data.

8. The system of claim 5, wherein the memory further comprises instructions that further configure the system to:

receive an indication that time data received from the first device and second device are synchronized;

wherein using the first time data and the second time data to determine that the first device detected the utterance prior to the second device comprises comparing the first time data directly to the second time data.

9. The system of claim 5, wherein the memory further comprises instructions that further configure the system to:

receive, from the first device, offset data corresponding to a synchronization between clock data of the first device and clock data of the second device; and store an association between the offset data and the user profile.

10. The system of claim 9, wherein the memory further comprises instructions that further configure the system to:

combine the offset data with the first time data to determine first offset time data; and combine the offset data with the second time data to determine second offset time data;

wherein using the first time data and the second time data to determine that the first device detected the utterance prior to the second device comprises comparing the first offset time data to the second offset time data.

11. A computer-implemented method comprising:

receiving first audio data corresponding to first audio detected by a first device;

receiving first time data corresponding to a time of detection of the first audio by the first device;

receiving second audio data corresponding to second audio detected by a second device;

receiving second time data corresponding to a time of detection of the second audio by the second device;

determining an offset value between the first time data and the second time data;

determining that the first device and the second device are associated with a same user profile;

performing speech processing on the first audio data to obtain first text data;

performing speech processing on the second audio data to obtain second text data;

determining a correlation between the first text data and the second text data;

determining, based in part on the offset value and the correlation, that the first audio data and the second audio data correspond to a same utterance; and using the first time data and the second time data to determine that the first device detected the utterance prior to the second device detecting the utterance.

12. The computer-implemented method of claim 11, further comprising:

determining output data corresponding to the first text data; and in response to determining that the first device detected the utterance prior to the second device detecting the utterance, sending the output data to the first device.

13. The computer-implemented method of claim 11, further comprising:

sending, to the second device, a command to close a process associated with the second audio data.

14. The computer-implemented method of claim 11, further comprising:

receiving an indication that time data received from the first device and second device are synchronized;

wherein using the first time data and the second time data to determine that the first device detected the utterance prior to the second device comprises comparing the first time data directly to the second time data.

15. The computer-implemented method of claim 11, further comprising:

receiving, from the first device, offset data corresponding to a synchronization between clock data of the first device and clock data of the second device; and storing an association between the offset data and the user profile.

16. The computer-implemented method of claim 15, further comprising:

combining the offset data with the first time data to determine first offset time data; and combining the offset data with the second time data to determine second offset time data; wherein using the first time data and the second time data to determine that the first device detected the utterance prior to the second device comprises comparing the first offset time data to the second offset time data.

* * * * *